United States Patent
Kayma et al.

(10) Patent No.: US 11,936,165 B2
(45) Date of Patent: Mar. 19, 2024

(54) SWITCH CABINET ARRANGEMENT WITH A SWITCH CABINET FRAME AND A MULTIPOLE TOUCH PROTECTION MODULE MOUNTED ON A MOUNTING PLATE

(71) Applicant: RITTAL GMBH & CO. KG, Herborn (DE)

(72) Inventors: Jörg Kayma, Herborn (DE); Jörg Kreiling, Herborn-Burg (DE); Andreas Bastian, Dillenburg (DE); Ann-Sylvia Jakob, Schöffengrund (DE); Stefan Temme, Sinn-Fleisbach (DE)

(73) Assignee: RITTAL GMBH & CO. KG (DE)

( * ) Notice: Subject to any disclaimer, the term of this patent is extended or adjusted under 35 U.S.C. 154(b) by 336 days.

(21) Appl. No.: 17/602,813

(22) PCT Filed: Feb. 20, 2020

(86) PCT No.: PCT/DE2020/100121
§ 371 (c)(1),
(2) Date: Oct. 11, 2021

(87) PCT Pub. No.: WO2020/207523
PCT Pub. Date: Oct. 15, 2020

(65) Prior Publication Data
US 2022/0158421 A1 May 19, 2022

(30) Foreign Application Priority Data
Apr. 11, 2019 (DE) .................. 10 2019 109 638.3

(51) Int. Cl.
*H02B 1/04* (2006.01)
*H02B 1/14* (2006.01)
(Continued)

(52) U.S. Cl.
CPC ............ *H02B 1/043* (2013.01); *H02B 1/14* (2013.01); *H02B 1/21* (2013.01); *H02B 1/32* (2013.01)

(58) Field of Classification Search
CPC . H02B 1/043; H02B 1/14; H02B 1/21; H02B 1/32
See application file for complete search history.

(56) References Cited

U.S. PATENT DOCUMENTS

| | | | |
|---|---|---|---|
| 8,625,256 B2 * | 1/2014 | Schmid | ................ H02G 5/066 174/70 B |
| 10,250,017 B2 | 4/2019 | Bastian | |

(Continued)

FOREIGN PATENT DOCUMENTS

| | | |
|---|---|---|
| DE | 10-2016-107565 A1 | 10/2017 |
| DE | 10-2017-108523 A1 | 10/2018 |

(Continued)

OTHER PUBLICATIONS

English translation of WO 2017198484 (Year: 2017).*
(Continued)

*Primary Examiner* — Mukundbhai G Patel
(74) *Attorney, Agent, or Firm* — Harness, Dickey & Pierce, P.L.C.

(57) ABSTRACT

A switch cabinet arrangement having at least one switch cabinet frame and at least one multipole touch protection module which is mounted on a mounting plate in the interior of the switch cabinet frame and in which a plurality of busbars are accommodated in a touch safemanner and are accessible to device adapters via contacting passages, wherein the touch protection module has a modular housing with at least one central module or a plurality of central modules which are arranged in a row and are identical to one another, the at least one central module or at least one of the central modules being closed at its end facing a vertical outer
(Continued)

Figure 1:
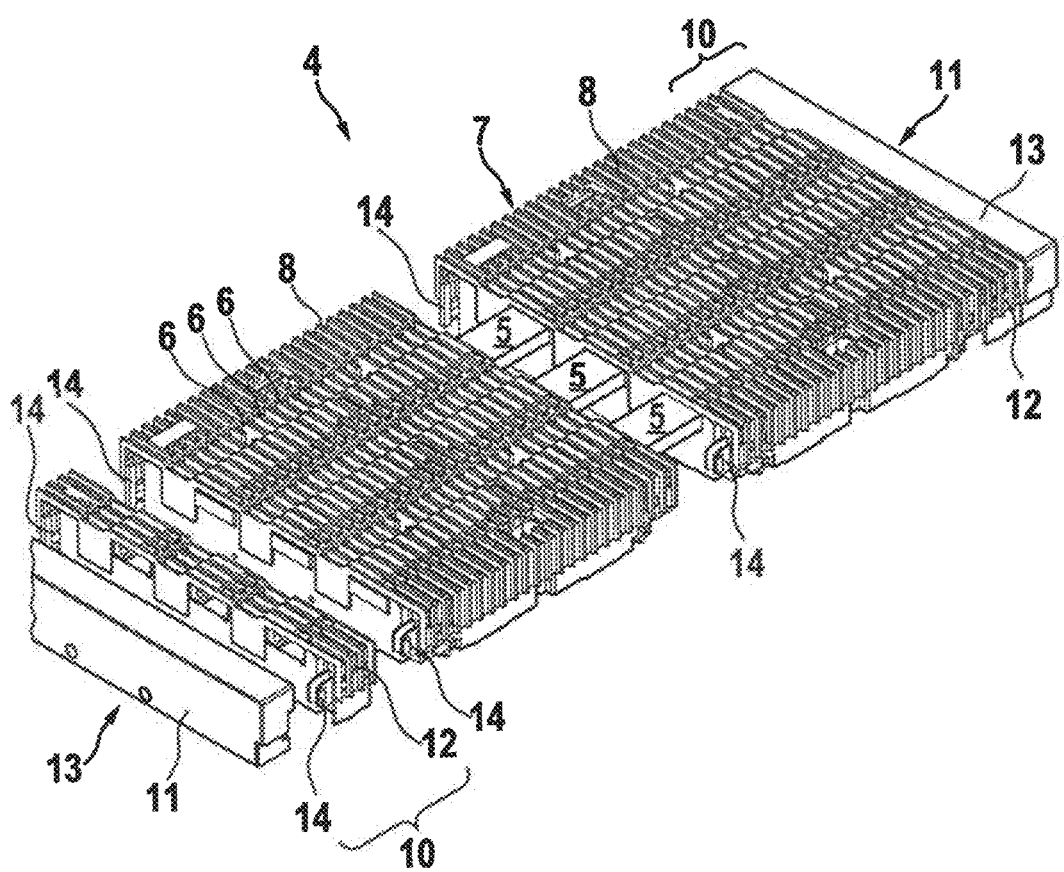

edge by an end module which is aligned with the vertical outer edge of the mounting plate with its vertical end side or projects beyond the latter.

14 Claims, 5 Drawing Sheets

(51) Int. Cl.
*H02B 1/21* (2006.01)
*H02B 1/32* (2006.01)

(56) References Cited

U.S. PATENT DOCUMENTS

| | | |
|---|---|---|
| 10,374,396 B2 | 8/2019 | Schell et al. |
| 2015/0111426 A1 | 4/2015 | Buettner et al. |
| 2019/0115676 A1 | 4/2019 | Steinberger |
| 2019/0148870 A1 | 5/2019 | Steinberger et al. |
| 2019/0393640 A1 | 12/2019 | Steinberger et al. |

FOREIGN PATENT DOCUMENTS

| | | | |
|---|---|---|---|
| EP | 2864596 A1 | 4/2015 | |
| EP | 3258558 B1 | 9/2018 | |
| WO | WO-2016019410 A1 * | 2/2016 | ........... H01R 25/142 |
| WO | WO-2017198484 A1 * | 11/2017 | ........... H01R 13/447 |

OTHER PUBLICATIONS

E.T.A. S.P.A.: p. 58 of "ETA Hauptkatalog 2014—innovative enclosure solutions for industrial & electronic applications" (with English translation).

International Search Report (in English and German) and Written Opinion of the ISA (in German) issued in PCT/DE2020/100121, dated May 7, 2020; ISA/EP.

German International Preliminary Report on Patentability issued in PCT/DE2020/100121, dated Feb. 24, 2021.

* cited by examiner

SWITCH CABINET ARRANGEMENT WITH A SWITCH CABINET FRAME AND A MULTIPOLE TOUCH PROTECTION MODULE MOUNTED ON A MOUNTING PLATE

CROSS-REFERENCE TO RELATED APPLICATIONS

This application is a U.S. National Phase Application under 35 U.S.C. 371 of International Application No. PCT/DE2020/100121, filed on Feb. 20, 2020, which claims priority to German Patent Application No. 10 2019 109 638.3, filed on Apr. 11, 2019. The entire disclosures of the above applications are incorporated herein by reference in their entirety.

BACKGROUND

This section provides background information related to the present disclosure which is not necessarily prior art.

TECHNICAL FIELD

The invention is based on a switch cabinet arrangement with at least one switch cabinet frame and at least one multipole touch protection module mounted on a mounting plate in the interior of the switch cabinet frame, in which several busbars are accommodated in a touch safe manner and are accessible via contacting passages for device adapters. Such a switch cabinet arrangement is described in WO 2017/198484 A1. A similar arrangement is also described in EP 3 258 558 B1.

DISCUSSION

The switch cabinet arrangements known from the prior art have the disadvantage that the touch protection modules only allow ineffective utilization of the clear installation width of the switch cabinet interior for mounting device adapters on the touch protection modules. This ineffectiveness kicks in in particular in the baying situation of several switch cabinet frame racks connected to one another in series, whereby the interiors of the switch cabinet frame racks are commonly connected to one another, but due to the design of the known touch protection modules an effective utilization of the created continuous switchgear cabinet interior space is not possible.

SUMMARY

This section provides a general summary of the disclosure, and is not a comprehensive disclosure of its full scope or all of its features.

It is therefore one aspect of the invention to further develop a switch cabinet arrangement of the type described above in such a way that effective utilization of the interior of the switch cabinet is created for mounting device adapters on the touch protection module.

Accordingly, it is provided that the touch protection module has a modular housing with at least one central module or a plurality of central modules which are identical to one another and are arranged in a row, the at least one central module or at least one of the central modules being closed at its end facing a vertical outer edge by an end module which is aligned with or projects beyond the vertical outer edge of the mounting plate with its vertical end face.

The described modular structure of the touch protection module allows that the length of the touch protection module can be adapted to a respective horizontal width of a given mounting plate. For example, for a given width of the end modules, the width of the at least one central module may be determined such that the width of a mounting panel that can be superstructed is just an integer multiple of the width of the central modules plus twice the width of the end modules when one end module is disposed at each of the opposing horizontal longitudinal ends of the at least one central module or a plurality of interconnected central modules.

Likewise, in the baying situation of multiple switchgear cabinets, the sum of the width that can be covered by the multiple mounting plates plus the distance formed between the mounting plates can be an integer multiple of the width of the central modules plus twice the width of the end modules. For example, in the baying situation of two interconnected switch cabinet frames, five central modules having a width of 20 cm may be interconnected and terminated at their opposite longitudinal ends by a respective end module having a width of 5.2 cm. In this embodiment, the width of the mounting plate may be 109.0 to 110.4 cm.

The housing may be aligned with opposing vertical end faces of respective end modules each having a vertical outer edge of the same mounting plate of a single enclosure frame rack, or each having a vertical outer edge of different mounting plates of a row of at least two enclosure frame racks.

The end module may be formed in two parts and include both a central module extension adjacent to the central module and an end cap adjacent to the end of the central module extension and closing the central module extension at the vertical end face.

The central module extension and the end cap may be connected to each other by a releasable connection, and preferably may be connected to each other by a latching connection. The releasable connection may be identical to a releasable connection between two of the plurality of central modules.

If several switch cabinet frame racks are lined up, the contact module can extend without interruption between the lined-up switch cabinet frame racks. For example, the busbars can also each extend in one piece, i.e. as a continuous uninterrupted rail across the entire width of the lined-up frame racks.

In this case, the touch protection module can be mounted in each of the switch cabinet frame racks on a mounting plate in each case and have a baying module in a transition region between the switch cabinet frame racks lined up next to one another, with which the touch protection module superstructs two vertical struts of the switch cabinet frame racks lined up next to one another via their sealing webs. In this regard, the baying module may be connected on opposite sides to a respective one of the central modules. The busbars can be designed to be continuous over their entire length and, in particular, between the adjacent switch cabinet frame racks.

The baying module may be a further central module identical to the central modules previously described and connected at its opposite ends to a respective one of the central modules, so that a row of at least three interconnected central modules extends from a first of the bayed enclosure frame racks into a second of the bayed enclosure frame racks.

The touch protection module can have equidistant contacting openings over its entire length, except for any end caps arranged at the ends, and without interruption, so that a continuous grid of contacting openings for contacting device adapters is created across the control cabinets when the touch protection module extends over several control cabinet frame racks.

The baying module may have at least two central module extensions, each of which is connected to a central module of different control cabinet frame racks and which are connected to each other via a one-piece cover that is free of openings. The central module extensions of the baying module may be identical to the central module extensions described further above.

The bus bars may extend across the entire horizontal width of the mounting plate, the bus bars being aligned at at least one of their two ends with a vertical outer edge of the at least one mounting plate or being positioned less than 10 mm forward or rearward thereof.

The end caps can cover the busbars at their end faces and starting therefrom in their longitudinal direction at the ends, so that when the end cap is removed the free ends of the busbars are freely accessible. For example, the end caps may cover the busbars by approximately 5 to 15 cm in the horizontal width of the mounting plate so that the busbar ends are exposed to that extent when the end cap is removed.

The mounting plate can be arranged in the clear opening dimension of a vertical profile frame of the switch cabinet frame, which is delimited on the inside by two opposite, parallel and vertical profile sides of the profile frame. The end module can project with its vertical end face beyond the vertical outer edge of the mounting plate and reach up to one of the vertical profile sides of the profile frame or be positioned in front of it by a maximum of 10 mm and preferably by a maximum of 5 mm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
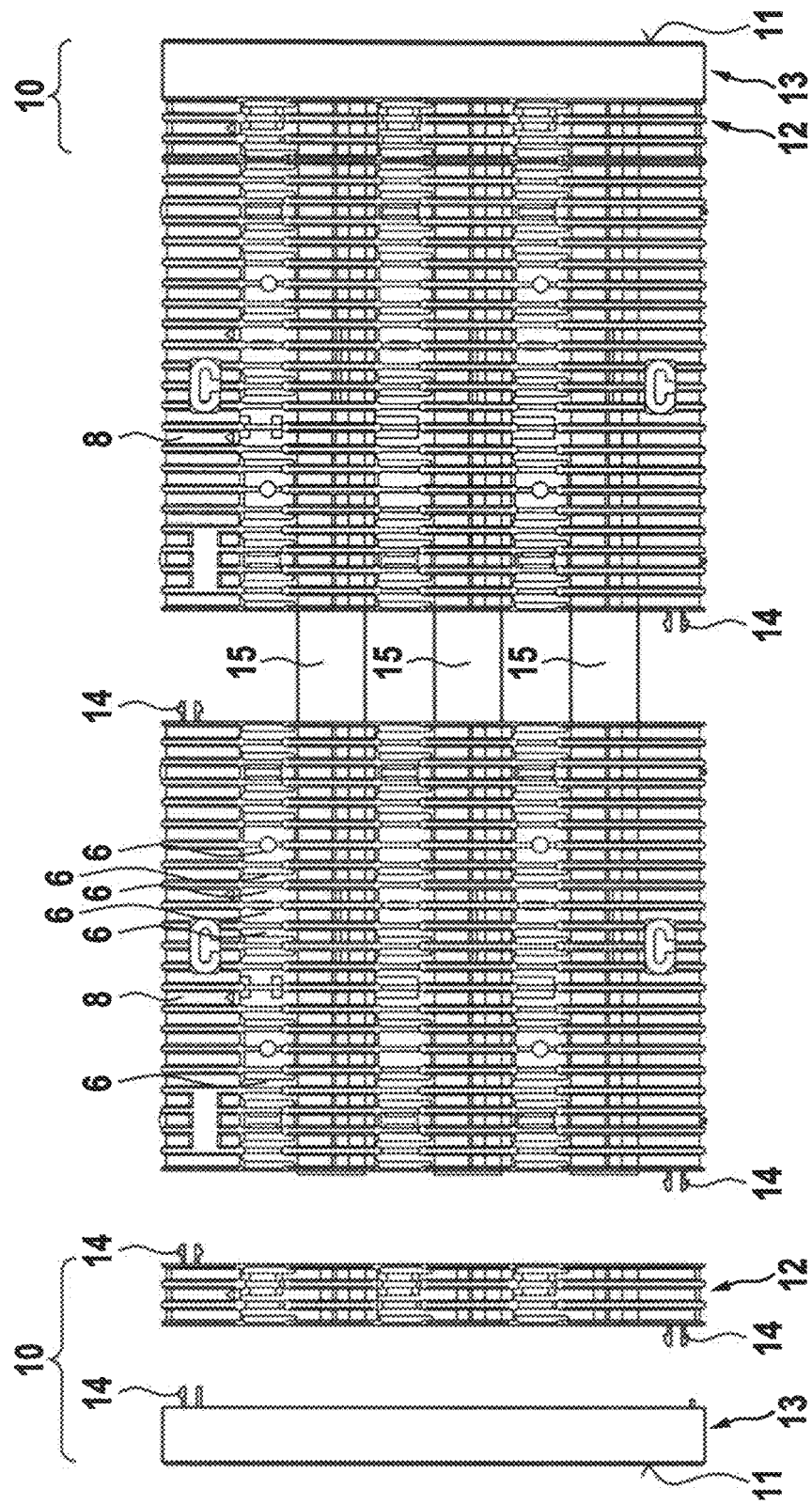
Figure 3:
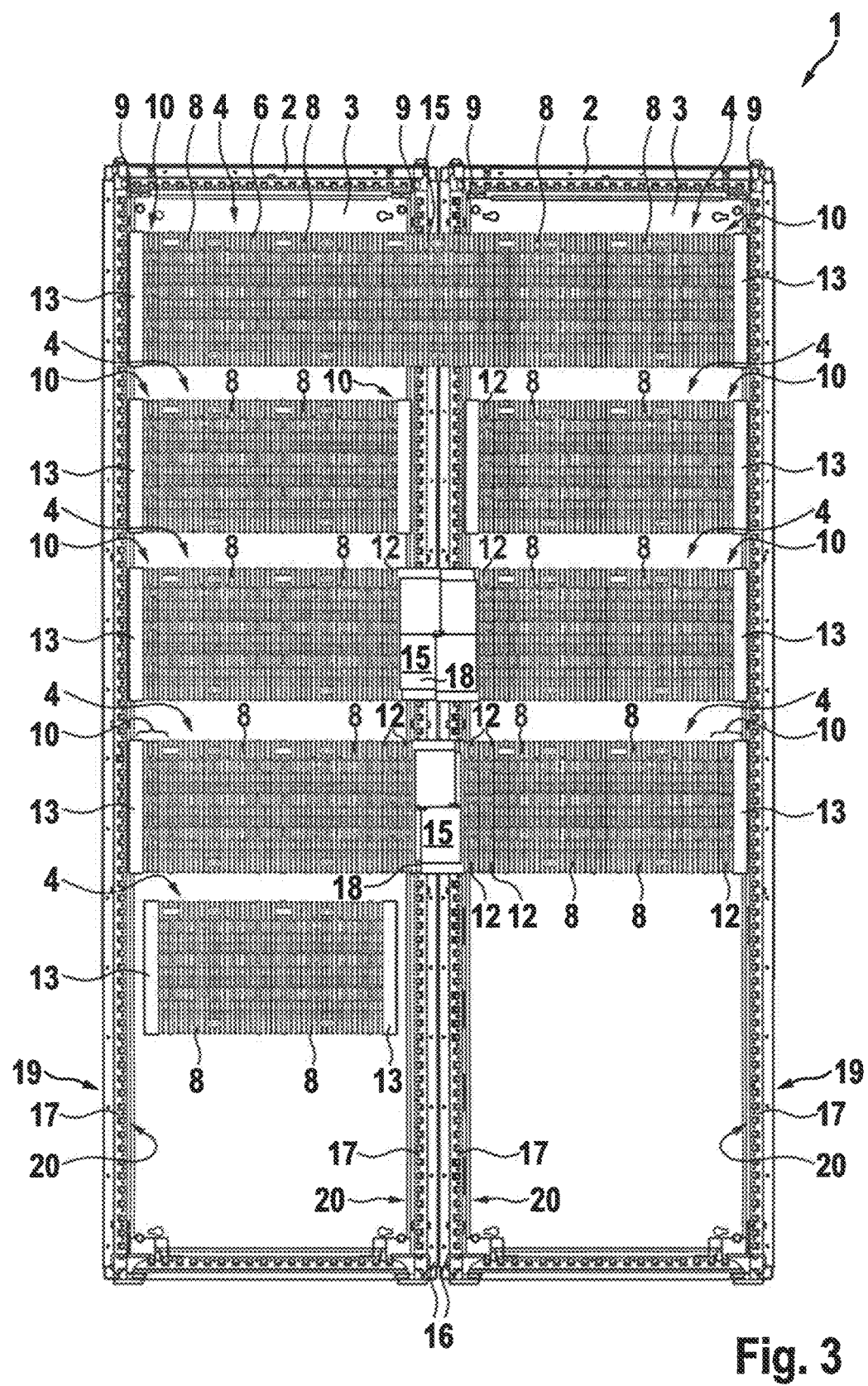
Figure 4:
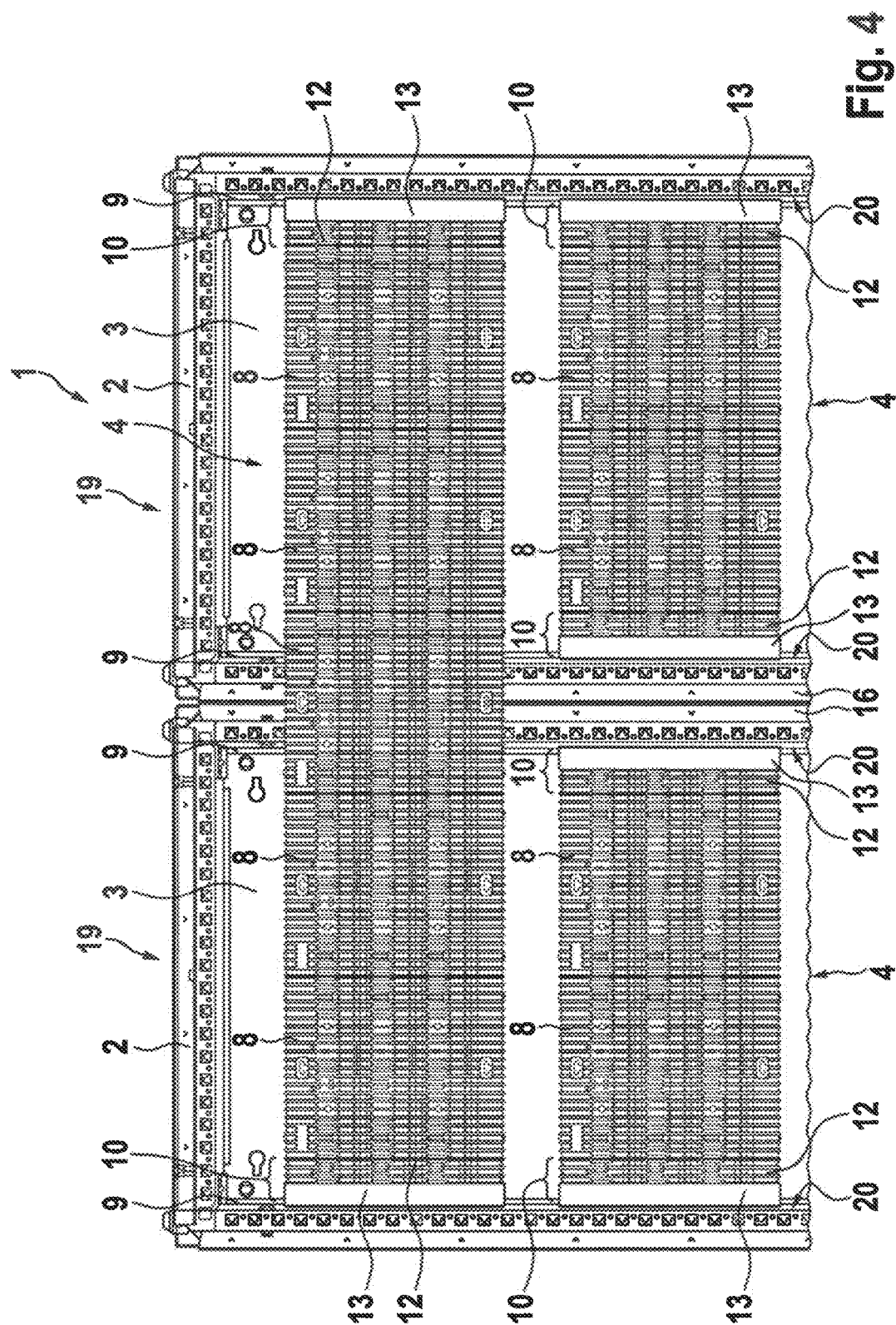

Further details of the invention will be explained with reference to the figures below. Thereby showing:

FIG. 1 a perspective view of an exemplary embodiment of a touch protection module according to the invention in a partially exploded view;

FIG. 2 a top view of the front side of the touch protection module according to FIG. 1;

FIG. 3 a front view of an exemplary switch cabinet arrangement consisting of two frame racks arranged side by side;

FIG. 4 a detailed view of the embodiment according to FIG. 3; and

Figure 5:
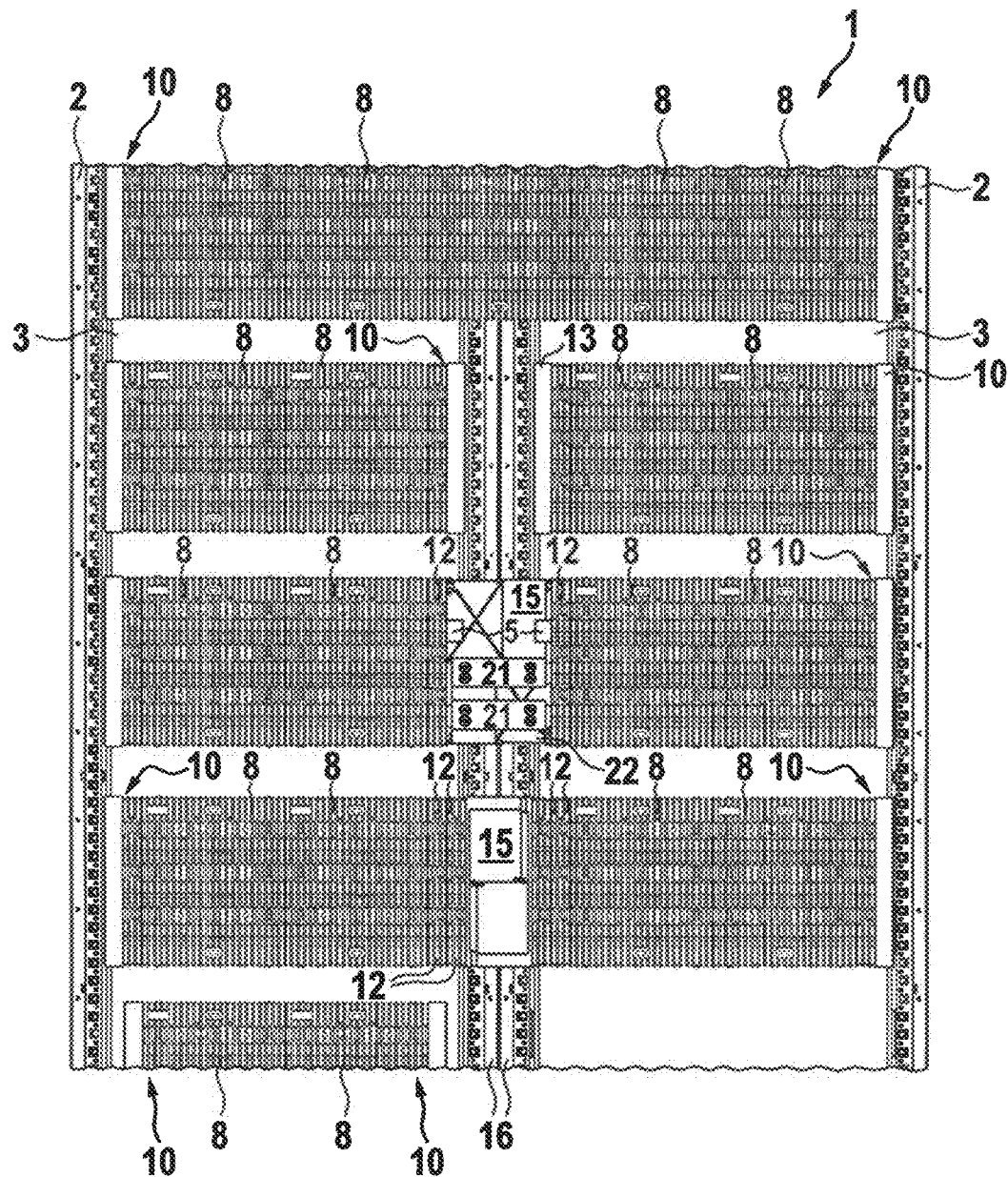

FIG. 5 another detailed view of the embodiment according to FIG. 3.

DETAILED DESCRIPTION

Example embodiments will now be described more fully with reference to the accompanying drawings.

The touch protection module 4 shown in FIGS. 1 and 2 essentially comprises two central modules 8, which are connected to one another by a snap-in connection 14 and are each terminated at opposite longitudinal ends by an end module 10. The end modules 10 as well as the two central modules 8 together form the housing 7 of the touch protection module 4, which can be formed in the manner known from the prior art, for example from an electrically non-conductive plastic material. Three busbars 5 are accommodated in the housing 7 in a touch safe manner and are accessible only via contacting passages 6 from the front side of the housing 7 for electrical devices and adapters. Corresponding device adapters and contact terminals are described, for example, in EP 3 258 558 B1.

The end modules 10 are in turn formed of an end cap 13 and a central module extension 12. All of the connections 14 are formed as identical snap-in connections, so that any combination is possible, in particular between the central modules 8 and the extension modules 12. For example, to adapt the touch protection module 4 shown in FIGS. 1 and 2 to a given horizontal mounting plate width, the extension modules 12 can also be removed and the end caps 13 snapped directly onto the central modules 8. Similarly, it is possible to connect one or more further central modules 8 between the two central modules 8 shown in FIGS. 1 and 2.

Exemplary combinations of the individual modules of the touch protection module 4 are shown in FIGS. 3 to 5. FIGS. 3 to 5 show the baying situation consisting of two frame racks 2 bayed against one another, each of which has a horizontal profile frame 19 consisting of two parallel vertical struts and two parallel horizontal struts, in the clear opening dimension of which a mounting plate 3 is mounted in each case. At facing vertical struts 17 of the profile frames 19, the profile frames 19 are aligned with respect to each other via sealing webs 16 and sealed against each other. In this way, a defined alignment of the frame racks 2 with respect to each other can be achieved.

In the illustration according to FIG. 3, six touch protection modules 4 are shown. The upper touch protection module 4 in the illustration is provided with contacting passages 6 over its entire horizontal width, except for the end caps 13, so that maximum use is made of the combined enclosure interior space of the two enclosure frame racks arranged side by side. Optionally, alternative end caps 13 may be provided in a left-hand and right-hand embodiment, each of which may then have two or three further rows of contacting apertures 6 to further increase the utilisation of the internal cabinet space. However, this would then be at the expense of flexibility, since when the additional contacting passages 6 are fitted with devices or adapters, the alternative end cap cannot be removed to expose the busbar ends.

In particular, also in a superstructure region between the two internal spaces, in which the two vertical struts 17 adjoin each other, the upper touch protection module 4 has a baying module 15 which is identical to the central modules 8. At the opposite ends, the thus five interconnected central modules 8 each have an end module 10 which is in turn each composed of a central module extension 12 and an end cap 13.

In the second row from the top, two separate touch protection modules 4 are provided for each switch cabinet frame 2, so that no mounting of device adapters is possible in a superstructure area between the switch cabinet frames 2, although on the other hand the complete horizontal width of the two mounting plates 3 is also utilized in this embodiment. In this case, the central modules 8 and the end modules 10 can have the same dimensions and also be of the same overall construction as the central modules 8 and the end modules 10 of the previously described embodiment of the touch protection module, which is the uppermost embodiment in the representation according to FIG. 3.

In the central embodiment of the touch protection module 4 shown in FIG. 3, this is in turn formed continuously over the entire horizontal width of the two adjacent switch cabinet frame racks, whereby in a superstructure region between the two switch cabinet frame racks 2 a baying module 15 designed as a superstructure module is provided. The baying module/overhead module 15 essentially comprises a trough (not shown) through which the busbars extend, the busbars in the trough being covered from the front of the touch protection module 4 in a touch safe manner by a cover 18 which is snapped onto the trough and is designed to be removable from the trough. Via the trough, it is possible, for example, to electrically connect the busbars of the two touch protection modules 4 to one another.

The central touch protection module 4 may comprise four central modules 8, which are terminated towards the opposite ends of the touch protection module 4 via a respective end module 10 comprising a central module extension 12 and an end cap 13. Facing the baying module 15, the two central modules 8 facing the opposite sides of the baying module 15 are connected to the baying module 15 via a respective central module extension 12.

The fourth embodiment of the touch protection module from above shown in FIG. 3 differs in that the baying module 15, again designed as a superstructure module, has a smaller width and instead the central modules 8 on the opposite sides of the baying module 15 are each connected to the baying module 15 via two central module extensions 12.

The lowest embodiment of the touch protection module 4 according to FIG. 3 shows that the individual modules of the touch protection module 4 according to the invention can also be used to form touch protection modules 4 which do not use the entire horizontal mounting plate width. The lowest embodiment of the touch protection module 4 shown consists of two central modules 8 arranged in a row, which are directly closed at opposite longitudinal ends by an end cap 13. Compared with the second embodiment from above in FIG. 3, the latter embodiment thus differs in the absence of the two central module extensions 12 between the end caps 13 and the baying module 15, so that in the lowermost embodiment the touch protection module 4 is spaced from the respective outer edge 9 of the mounting plate 3 by a corresponding width of the central module extensions 12.

In addition, FIG. 5 shows the middle embodiment of the touch protection module 4 according to FIG. 3 with the cover 18 of the central module 15, which is designed as a superstructure module, removed. Here, the base trough 22 of the add-on module 15 can be seen, into which the busbars 5 extend over their free ends and are thus accessible for contacting with each other. The lower and the middle busbars are each connected to each other by a busbar connector 21. After the upper pair of busbars has also been connected to each other via a corresponding connector 21, the bottom trough 22 can again be closed with a cover 18.

The use of such superstructure modules 15 with a base trough 22 and a cover 18 is particularly expedient when a subsequent extension of a row of switch cabinets is desired, or when separate busbars instead of continuous busbars are preferred for better handling of the individual cabinets. Starting from the situation as shown in the second embodiment from above of the touch protection modules 4, when two switch cabinet frame racks are arranged side by side, the end caps 13 of the opposing individual touch protection modules 4 may be removed so that the free ends of the opposing busbars 5 are exposed. In a further step, the base trough 22 can be inserted behind the busbar ends. In a further step, the busbar connectors 21 are fitted to connect the busbars 5 together. In a final step, the cover 18 can then be fitted to cover the connection points to prevent contact.

The features of the invention disclosed in the foregoing description, in the drawings as well as in the claims may be essential to the realization of the invention either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet arrangement with at least one switch cabinet frame and at least one multipole touch protection module mounted on a mounting plate in the interior of the switch cabinet frame, in which a plurality of busbars are accommodated in a touch safe manner and are accessible to device adapters via contacting passages, wherein the touch protection module having a modular housing with at least one central module or a plurality of central modules which are arranged in a row and are identical to each other wherein the at least one central module or at least one of the central modules is closed at its end facing a vertical outer edge by an end module, wherein the end module is aligned with or projects beyond the vertical outer edge of the mounting plate with its vertical end face, wherein a plurality of the switch cabinet frame racks are lined up against one another, and wherein the touch protection module extends without interruption between the lined-up switch cabinet frame racks.

2. The switch cabinet arrangement according to claim 1, in which the housing is aligned with opposite vertical end faces of respective end modules with a respective vertical outer edge of the same mounting plate of a single switch cabinet frame or with a respective vertical outer edge of different mounting plates of a row of at least two switch cabinet frame racks.

3. The switch cabinet arrangement according to claim 1, in which the end module is formed in two parts and has both a central module extension adjoining the central module and an end cap adjoining the central module extension at the end and closing the central module extension at the vertical end face.

4. The switch cabinet arrangement according to claim 3, wherein the central module extension and the end cap are connected to each other via a releasable connection and are preferably connected to each other via a snap-in connection.

5. The switch cabinet arrangement according to claim 4, wherein the releasable connection is formed identically to a releasable connection between two of the plurality of central modules.

6. The switch cabinet arrangement according to claim 3, wherein the busbars extend over the entire horizontal width of the mounting plate, the busbars being aligned at least at one of their two ends with a vertical outer edge of the at least one mounting plate.

7. The switch cabinet arrangement according to claim 6, in which the end caps cover the busbars at their end faces and starting therefrom in their longitudinal direction at the ends, so that when the end cap is removed the free ends of the busbars are freely accessible.

8. The switch cabinet arrangement according to claim 1, in which the touch protection module is mounted in each of the switch cabinet frame racks on a respective mounting plate and has a baying module in a transition region between the aligned switch cabinet frame racks, with which the touch protection module superstructs two vertical struts of the aligned switch cabinet frame racks, the vertical struts adjoin one another via their sealing webs, and the baying module being connected on opposite sides in each case to a central module.

9. The switch cabinet arrangement according to claim 8, in which the busbars are designed to be uninterrupted over their entire length and, in particular, between the aligend switch cabinet frame racks.

10. The switch cabinet arrangement according to claim 8, wherein the baying module is a further central module which is identical to the at least one central module and which is connected at its opposite end faces to a respective one of the central modules so that a row of at least three interconnected central modules extends from a first of the bayed switch cabinet frame racks into a second of the bayed switch cabinet frame racks.

11. The switch cabinet arrangement according to claim 10, in which the touch protection module has equidistant contacting openings over its entire length, except for any end caps arranged at the ends, and without interruption, so that, in the case of a touch protection module extending over a plurality of switch cabinet frame racks, a continuous grid of contacting openings for the contacting of device adapters is created across the switch cabinets.

12. The switch cabinet arrangement according to claim 8, in which the baying module has at least two central module extensions which are each connected to a central module of different switch cabinet frame racks and which are connected to one another via a one-piece cover which is free of openings.

13. The switch cabinet arrangement according to claim 12, wherein the central module extensions of the baying module are identical to another central module extension.

14. The switch cabinet arrangement according to claim 1, in which the mounting plate is arranged in the clear opening dimension of a vertical profile frame of the switch cabinet frame, which is bounded on the inside by two opposite, parallel and vertical profile sides of the profile frame, the end module projecting with its vertical end face beyond the vertical outer edge of the mounting plate and reaching as far as one of the vertical profile sides of the profile frame or being projecting therefrom by a maximum of 10 mm and particularly preferably by a maximum of 5 mm.

* * * * *